Jan. 19, 1960  R. T. LARSSON ET AL  2,921,366
ASSEMBLY FIXTURE FOR THERMOSTATIC VALVES
Filed Feb. 28, 1957  3 Sheets-Sheet 1

INVENTORS
ROBERT T. LARSSON
NELLO L. BENEDETTI

BY *Hill, Sherman, Meroni, Gross & Simpson* ATTORNEYS

Jan. 19, 1960   R. T. LARSSON ET AL   2,921,366
ASSEMBLY FIXTURE FOR THERMOSTATIC VALVES
Filed Feb. 28, 1957   3 Sheets-Sheet 2

INVENTORS
ROBERT T. LARSSON
NELLO L. BENEDETTI

BY
ATTORNEYS

INVENTORS
ROBERT T. LARSSON
NELLO L. BENEDETTI

United States Patent Office 2,921,366
Patented Jan. 19, 1960

2,921,366

ASSEMBLY FIXTURE FOR THERMOSTATIC VALVES

Robert T. Larsson, Mount Prospect, and Nello L. Benedetti, Chicago, Ill., assignors to The Dole Valve Company, Chicago, Ill., a corporation of Illinois Application February 28, 1957, Serial No. 643,058

1 Claim. (Cl. 29—200)

This invention relates to improvements in thermostatic valves and methods of assembling the same.

A principal object of the invention is to provide a simple and improved form of thermostatic valve arranged with the view toward utmost simplicity in construction and assembly.

Another object of the invention is to provide a novel and improved form of poppet type of thermostatic valve in which the fastening parts of the valve are formed integrally with the valve parts.

A further object of the invention is to provide a self-seating thermostatic valve mounted for tilting movement with respect to the casing of the valve and maintained in engagement with its seat by the return spring for the thermal sensitive element of the valve.

A still further object of the invention is to provide a positive and simple method of assembling thermostatic valves and securing the parts of the valve together, in which assembly is attained by properly locating the parts of the valve and then performing a series of substantially simultaneous upsetting, staking and pressing operations thereon.

A still further object of the invention is to provide a thermostatic valve arranged with a view toward simplicity and ease of assembly, in which the fastening parts of the valve for fastening the parts thereof together are pressed from the valve parts themselves and form locating means therefor, and in which the operation of fastening the parts of the valve together is in a series of substantially simultaneous staking, upsetting and pressing operations.

These and other objects of the invention will appear from time to time as the following specification proceeds and with reference to the accompanying drawings wherein.

Figure 1:
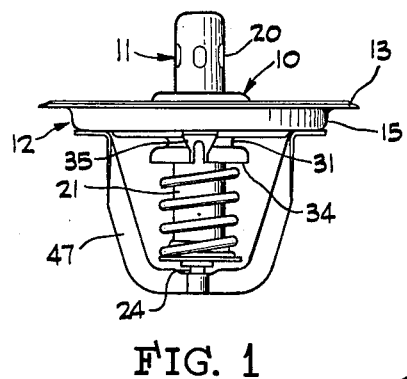
Figure 1 is a view in side elevation of a thermostatic valve of a type particularly adapted to control the temperature of the coolant of an internal combustion engine, showing the valve inverted from the position it normally assumes in the cylinder head of an internal combustion engine, and in the position it is in as removed from the assembly fixture therefor.
Figure 2:
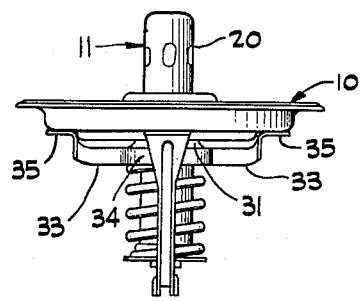
Figure 2 is a view somewhat similar to Figure 1, but showing the valve turned 90° from the position shown in Figure 1.
Figure 3:
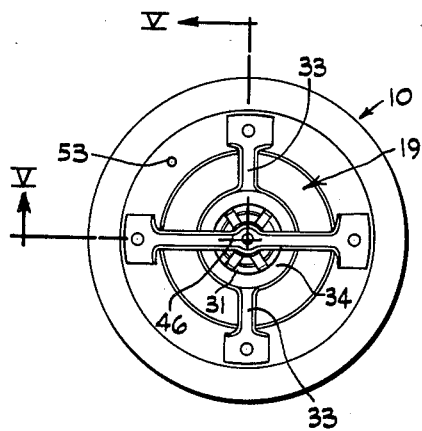
Figure 3 is a plan view of the valve, looking at the valve from the downstream end thereof.

In the embodiment of the invention illustrated in the drawings, we have shown a thermostatically operated valve 10 particularly adapted to control the temperature of the coolant of an internal combustion engine and usually mounted in the cylinder head of the internal combustion engine, with a thermal sensitive element 11 thereof positioned in the water jacket of the engine on the upstream side of the valve, and opening the valve against the pressure of the coolant flowing from the water jacket to the radiator.

The valve 10 includes a shallow valve body 12 having an annular flange 13 adapted to be seated on the cylinder head of an internal combustion engine and to be retained thereto by the fitting for the hose connection leading to the radiator of the engine. The valve body 12 also has a relatively short cylindrical wall 15 defining the inner margin of the flange 13, and has an annular portion 16 extending inwardly therefrom, terminating in a generally frusto-conical seating portion 17 for a poppet valve 19. The inner margin of the seating portion 17 forms a port for the valve, affording communication from the upstream to downstream side of the housing 12.

The thermal sensitive element 11 forms a mounting for the valve 19 and is herein shown as being a well known form of long stroke power or solid fill type of thermal sensitive element, having a casing 20 containing a thermally expansible material, a cylinder 21 extending from said casing, and a clamping ring 23, clamping said cylinder to said casing. The thermally expansible material reacts against a flexible membrane (not shown) at the inner end of the casing 20, for extending a power member or piston 24 from the cylinder 21 upon fusion of a fusible thermally expansible material contained within the casing 20, at the operating range of the thermal sensitive element, as shown and described in the Vernet Patent No. 2,368,181, dated January 30, 1945.

Figure 4:
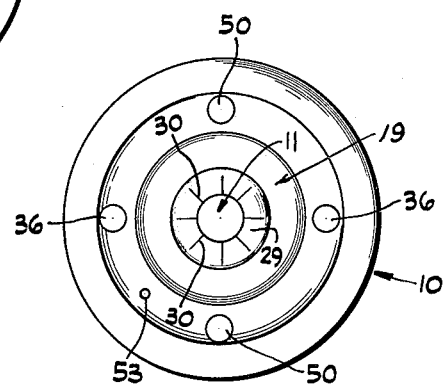
Figure 4 is a plan view of the valve looking at the valve from the upstream end thereof.
Figure 5:
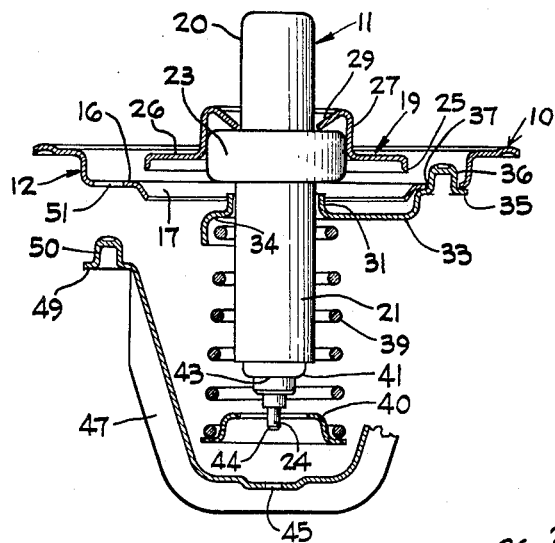
Figure 5 is an exploded view of the valve taken substantially along line V—V of Figure 3 and illustrating the positioning of the parts of the valve for assembly.

The valve 19 has an annular valve face 25 engageable with the seat 17 and has a body portion 26 extending inwardly from said valve face and terminating into a cylindrical wall 27 extending at right angles to the body portion 26. The cylindrical wall 27 is adapted to fit closely around the clamping ring 23 and terminates into an inwardly extending portion 29, extending downwardly with respect to said wall and of a generally frusto-conical form, prior to assembly of the valve. The portion 29 is shown in Figure 4 as having a plurality of slits 30 therein, and is pressed into engagement with the clamping ring 23 and the cylinder 20 during assembly of the valve, to rigidly mount the valve on the clamping ring 23 of the thermal element 11.

Coaxial with the center of the valve body 12 and port leading therethrough, and spaced downstream from the seat 17 is an annular guide 31 forming a loose guide for the cylinder 21 of the thermal sensitive element and accommodating limited tilting of said cylinder and the valve 19, and thereby enabling the valve to tilt in cases where the valve may encounter dirt on the valve seat, and rendering the valve self-seating. The annular guide 31 may be formed from a stamping, and has channeled support arms 33 extending in diametrically opposite directions from a channeled seat 34 encircling the guide 31, and terminating in feet 35 extending parallel to the annular portion 16. The feet 35 have hollow riveting portions 36 extending therefrom for registry with apertures or rivet holes 37 formed in the annular portion 16 of the valve body. The hollow riveting portions are shown as being formed integrally with the feet 35 and have a relatively close fit with the rivet holes 37. The hollow interior portion of said riveting portions extend entirely through the annular portion 16 of the valve body, to form a tightly riveted joint upon upsetting of said riveting portions, in the process of assembly of the valve, as will hereinafter more clearly appear as the specification proceeds.

The valve 19 is biased into engagement with the seat 17 by a spring 39, encircling the cylinder 21 of the thermal element and seated at one end on the annular seat 34 and at its opposite end on a spring retainer 40 fitting on a reduced diameter portion 41 of the cylinder 21, and secured thereto by pressing stakes 42 from a shoulder 43 of the portion 41 of the cylinder 21.

The piston 24 has a reduced diameter end portion 44 fitting through an apertured portion 45 of an abutment or bridge 46 and engaging said abutment, to effect movement of the thermal sensitive element 11 and valve 19 in a valve opening direction when the temperature to which the casing 20 of the thermal sensitive element 11 is subjected, reaches the fusion or operating temperature range of the thermal sensitive element. The bridge 46 is shown as positioned at right angles to the arms 33 of the annular guide 31, and as being generally channel-like in cross-section. The bridge 46 has legs 47 extending in diametrically opposite directions from the abutment face thereof toward the valve body 12, and has laterally extending feet 49 having hollow riveting projections 50 extending therefrom and adapted to fit through riveting apertures or holes 51 in the annular portion 16 of the valve body, and to be upset in engagement therewith to rigidly secure said bridge to the valve body.

A bleed hole 53 leads through the annular portion 16 of the valve body, to allow the filling of the water jackets of the engine when coolant is added to the radiator. This bleed hole is made small enough to prevent undue leakage through the closed valve when the engine is warming up.

Figure 6:
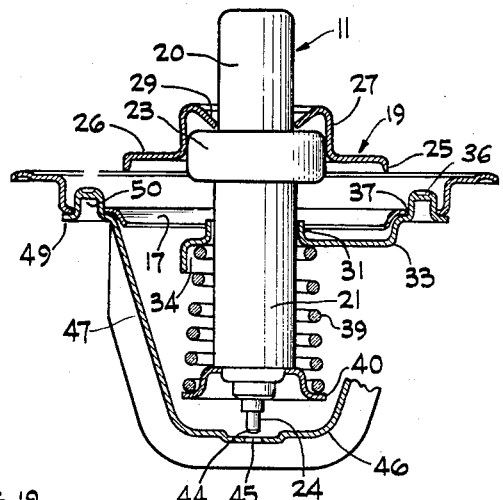
Figure 6 is a sectional view taken substantially along the same lines as Figure 5, showing the return spring for the thermal sensitive element compressed and the parts grouped together before the fastening operation thereof.
Figure 7:
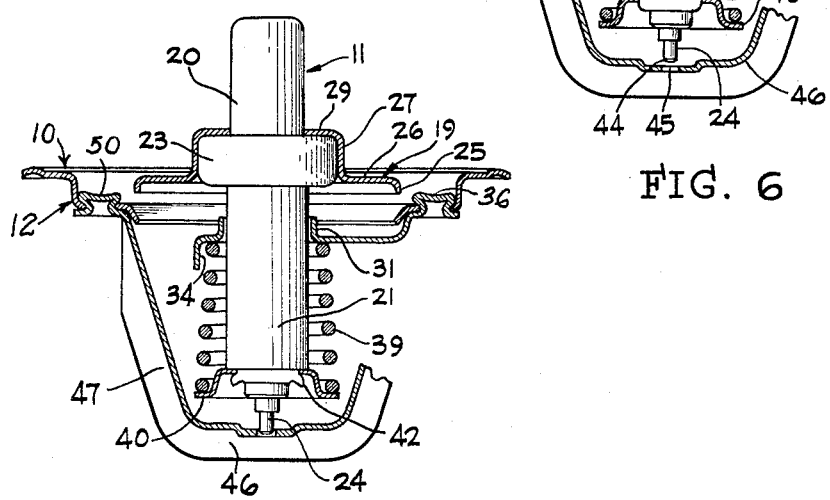
Figure 7 is a fragmentary sectional view taken substantially along the same lines as Figure 5 and showing the parts in connected relation with respect to each other.
Figure 8:
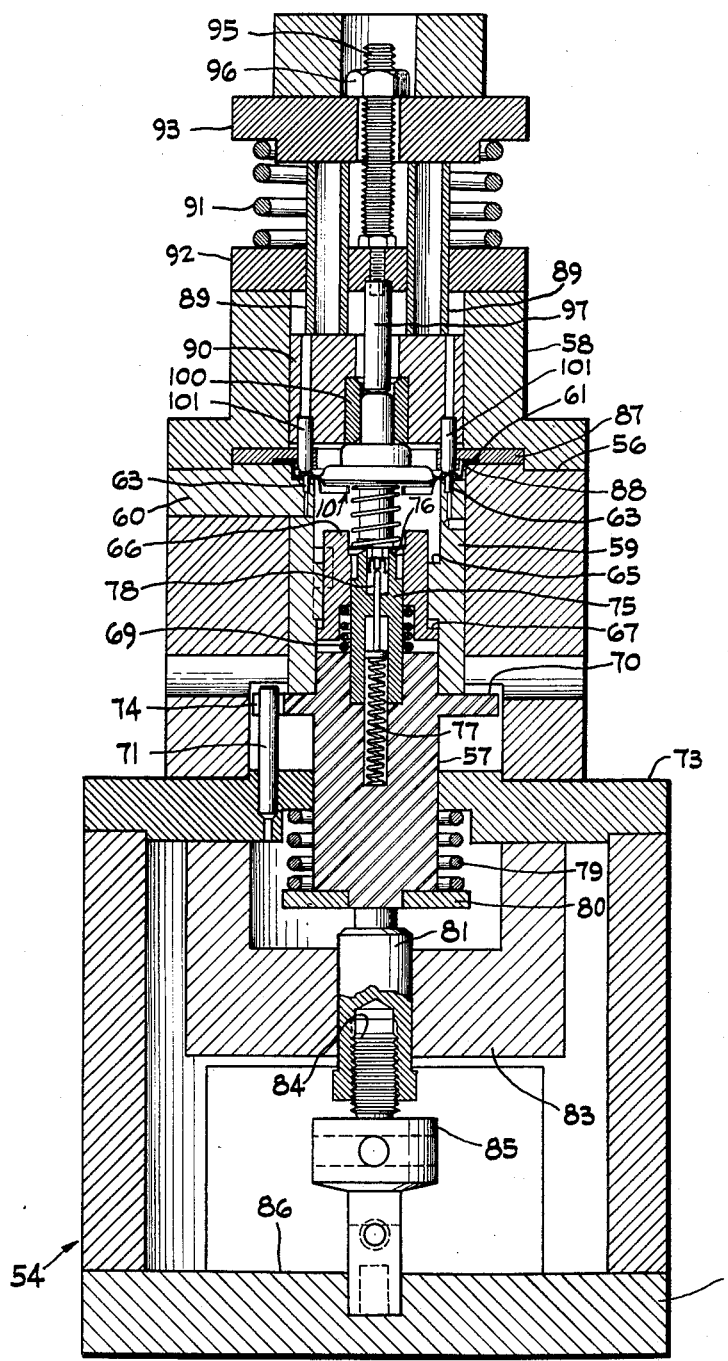
Figure 8 is a vertical sectional view taken through an assembly fixture and press for fastening the parts of the valve together in accordance with the principles of the invention.

Referring now to Figures 5 through 8 and the method of assembling and fastening the parts of the valve together, we have shown for illustrative purposes in Figure 8 a fixture 54 including a base plate 55 which may be mounted on a revolving worktable and having a table 56 which may be engaged by an upper pressure head or ram 58, for holding the valve in position during the fastening operations thereof. The fixture 55 and head 58 are shown as being hand operated for illustrative purposes only. It should, however, be understood that the fixture and head and movable parts thereof may be power operated by hydraulic pressure, if desired. It should further be understood that a number of fixtures may be provided on a rotating worktable and that the head 58 may be at one work station, if desired and may be vertically moved and engaged with the table 56 by hydraulic rams, if desired.

The table 56 is in the form of a relatively heavy plate having an open central portion having a sleeve 59 mounted therein, the upper margin of which sleeve in cooperation with a member 60 forms an annular shoulder upon which rests the feet 35 and 49 of the annular guide 31 and bridge 46, respectively. The feet 35 and 49 are located in a proper relation with respect to the valve body 12 by locating pins 63 extending within the hollow portions of the riveting projections 36 and 50, it being understood that four locating pins, located 90° apart are provided, and that two of said pins locate the annular guide 35 while the other two of said pins locate the bridge or abutment member 46.

Slidably guided within an inwardly extending portion 65 of the sleeve 59 is a guide sleeve 66, the inner margin of which is adapted to receive and locate the spring retainer 40 of the thermal sensitive element and form a locating guide therefor. The guide sleeve 66 is limited in upward movement by a flange 67 engageable with the shoulder formed by the bottom of the reduced diameter portion 65, and is biased toward said flange by a spring 69 seated within the guide sleeve 66 and abutting the upper face of a lower ram 57, slidably guided within the sleeve 59 and limited in movement along said sleeve by a flange 70 disposed intermediate the ends of the ram 57. The ram 57 is retained from turning movement by a guide pin 71 mounted at its lower end in a plate 73 and extending within a slot 74 in the flange 70.

Mounted in the ram 57 and extending upwardly therefrom within the guide sleeve 66 is a staking die 75, having spaced staking cutters 76. The bridge 46 and the reduced diameter end 44 of the piston 45 of the thermal sensitive element 11 are adapted to extend in the space between said staking cutters. The reduced diameter end portion of the piston 24 is axially drilled from the outer end thereof and the drilled portion thereof is adapted to be engaged by a locating pin 78 slidably guided in the staking die 75 and biased in extended relation with respect to said staking die by a compression spring 77.

The lower ram 57 is slidably guided in the plate 73 and is retractibly moved with respect to said plate by a compression spring 79, encircling said ram and interposed between the underside of said plate and a disk 80, mounted on the lower end of said ram and extending outwardly therefrom. A slidable abutment member 81 abuts the lower end of the ram 57 and is slidably guided in a frame member 83. The abutment member 81 has an internally threaded portion 84 having a capstan headed screw 85 threaded therein and reacting against the base plate 55, to move the ram 57 upwardly to compress the spring 39 of the thermostatic valve upon engagement of the head 56 with the valve body.

The head 58 has an annular plate 87 recessed in the lower end thereof, having a recessed portion 88 engageable with the flange 13 of the valve body 12, for retaining the valve body to the recessed portion of the table 56 upon lowering of said head. The head 58 has a ram 90 mounted therein for relative movement with respect thereto. A compression spring 91 is interposed between the top of a plate 92 of the head 58 and a movable plate 93, for biasing said movable plate and the head 90 in a retracted position with respect to the table 56. The plate 93 is guided on the plate 92 on hollow shafts 89 connected between the top of the ram 90 and the plate 93 and slidably guided in the plate 92. A threaded shaft 95 threaded in the plate 92 and extending upwardly therefrom through the plate 93 is provided to force the ram 90 downwardly by operation of a nut 96 threaded on said shaft and abutting the top of the plate 93. A pin 97 is shown as being mounted on and depending from the plate 92 of the head 58, for engaging the end of the casing 20 of the thermal sensitive element and holding the thermal element in position during staking of the cylinder 21 to the retainer 43.

The inner ram 90 has a sleeve 100 mounted therein slidably receiving the casing 20 of the thermal sensitive element 11 for holding the thermal sensitive element centered during the fastening of the parts by the valve, and engaging the outer end of the cylindrical portion 27 of the valve 19 and pressing the valve 19 onto the clamping ring 23 during downward movement of the inner ram 90. The inner ram 90 likewise has a plurality of riveting or upsetting pins 101 mounted therein, engageable with the rounded outer end portions of the riveting projections 36 and 50, for upsetting said riveting projection into engagement with the annular portion 16 of the valve upon downward movement of the inner ram 90, to effect a completely assembled valve, when said inner ram is in the position shown in Figure 8.

In assembling the valve, with the head 58 removed from the table 56, the bridge or reaction member 46 may first be registered with two diametrically opposed locating pins 63 with the abutment portion thereof in alignment with the space between the staking dies 76. The annular guide 33 may then be located on its locating pins 63 with the legs thereof at right angles to the legs of the bridge 46. The valve housing 12 may then be placed on the riveting projections 36 and 50 into position to be riveted thereto with the valve seat 16 facing upwardly. The retainer 40 may then be placed within the guide 66 while the spring 39 may then be interposed between the retainer 40 and the annular guide 31. The cylinder 21 and thermal sensitive element 11 may be placed through the annular guide 31 within the spring 39, with the end of its piston engaging the end of the locating pin 76. The parts will then be in substantially the position shown in Figure 5 except the bridge or abutment member 46 will be positioned adjacent the valve casing 12 with the riveting projections 50 registering with the rivet holes 51.

The top ram or head 58 may then be lowered into engagement with the annular flange 13 of the valve body 12 pressing the valve body on the riveting projections and clamping the valve body and the associated parts thereof in substantially the position shown in Figure 6, but with the spring 39 in its extended position. The bottom ram 57 may then be moved upwardly to compress the spring 39 and retain the parts in the position shown in Figure 6 before the fastening operation.

The inner ram 90 may at the same time be moved downwardly. Downward movement of the upsetting or riveting pins 101 will upset the riveting projections 36 and 50. The sleeve 100 coming into engagement with the outer end portion of the cylindrical portion 27 of the valve 19 will also press the valve onto the clamping ring 23 and engage the inwardly turned slit portion of the valve with the outer face of said clamping ring and with the wall of the casing adjacent said clamping ring, to securely fasten the valve 19 to the thermal sensitive element. During this operation continued upward movement of the lower ram 57 will engage the staking dies 76 with the shouldered portion 43 of the cylinder and stake the cylinder to the spring retainer 40 and positively hold said spring retainer in position on said cylinder.

It will be noted from Figure 7 that the valve 19 is in its open position when the parts thereof are in fastened relation with respect to each other. As, however, pressure is released from the head 58 and the rams 57 and 90, the valve 19 will be moved into its closed position by the spring 39, engaging the annular valve face 25 thereof with the seat 17.

It may be seen from the foregoing that we have provided an extremely simple thermostatic valve and method of assembly thereof and that the valve is assembled by merely grouping the parts in a fixture in the proper relation with respect to each other and then bringing the rams of the fixture together to first clamp the parts in assembled relation with respect to each other and then press, rivet and stake the parts in connected relation with respect to each other.

It may further be seen that the fastening means for the parts are all formed by the parts themselves, making it unnecessary to provide separate rivets and the like for connecting the parts together.

While we have herein shown and described one form in which the invention may be embodied, it will be understood that various modifications and variations in the invention may be effected without departing from the spirit and scope of the novel concepts thereof.

We claim as our invention:

In an assembly and fastening fixture for thermostatic valves and the like, a base having a table at the top thereof having a central recess therein and an open portion leading therefrom through said table, a central ram guided in said open portion for movement toward and from said table, means biasing said ram in retracted relation with respect to said table, other means moving said ram toward said table, spaced locating pins in said recessed portion extending upwardly thereinto for locating the bridge and guide of a thermal sensitive element, said lower ram having an annular locating member movable within said recessed portion upwardly to compress the spring of a thermal element and having staking dies disposed inwardly of said locating member for staking the spring retainer to the cylinder of the thermal sensitive element and also having a locating pin between said staking dies, adapted to have engagement with the piston of the thermal sensitive element of the valve, a head engageable with said table for clamping the casing of a thermostatic valve to said table, said head having a ram guided therein for movement toward and from the table, spring means biasing said ram in retracted relation with respect to said table, other means for moving said ram toward said table, said ram having upsetting pins extending downwardly therefrom to effect a series of simultaneous riveting operations and also having a central sleeve therein adapted to extend about the casing of the thermal sensitive element for movement therealong to effect the pressing of a valve thereto.

References Cited in the file of this patent

UNITED STATES PATENTS

| | | |
|---|---|---|
| 1,991,206 | Harrison | Feb. 12, 1935 |
| 2,047,434 | Schurmann | June 12, 1935 |
| 2,238,580 | Cambell | Apr. 15, 1941 |
| 2,321,755 | Kost | June 15, 1943 |
| 2,356,958 | Von Wangenheim | Aug. 29, 1944 |
| 2,404,118 | Yawman | July 16, 1946 |
| 2,435,675 | Curtis | Feb. 10, 1948 |
| 2,691,204 | Kellogg | Oct. 12, 1954 |
| 2,714,759 | Von Wangenheim | Aug. 9, 1955 |
| 2,761,209 | Fisher | Sept. 4, 1956 |
| 2,774,540 | Parlasca | Dec. 18, 1956 |
| 2,777,638 | Wood | Jan. 15, 1957 |
| 2,797,873 | Woods | July 2, 1957 |
| 2,829,834 | Drapeau | Apr. 8, 1958 |
| 2,834,548 | Olsen | May 13, 1958 |